Figure 8:
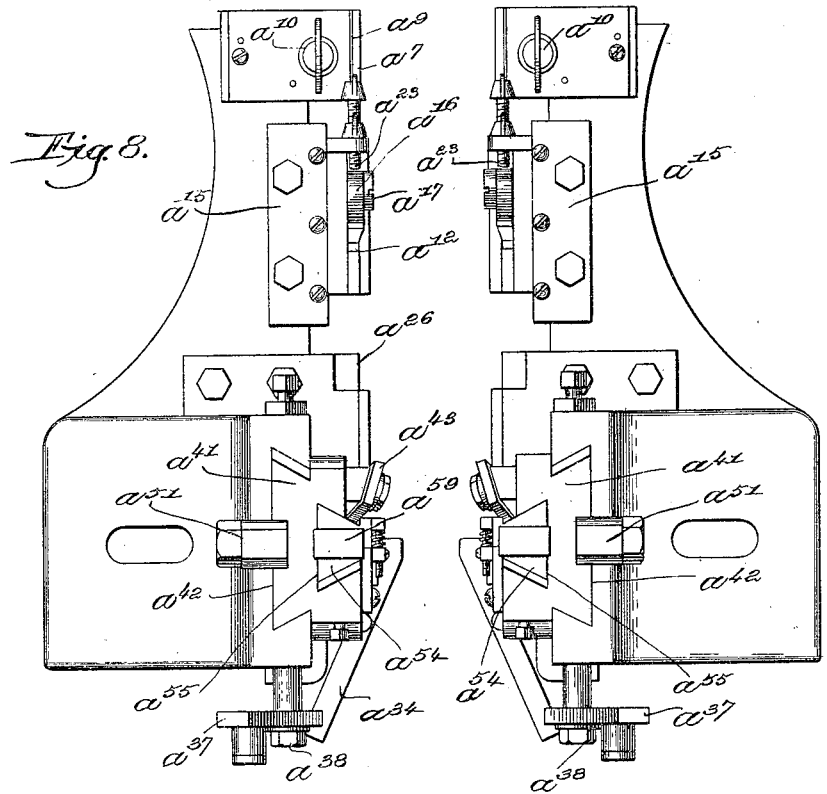

J. P. KUHNS.
PIN TICKET MACHINE.
APPLICATION FILED DEC. 26, 1902.
953,472.
Patented Mar. 29, 1910.
6 SHEETS—SHEET 1.
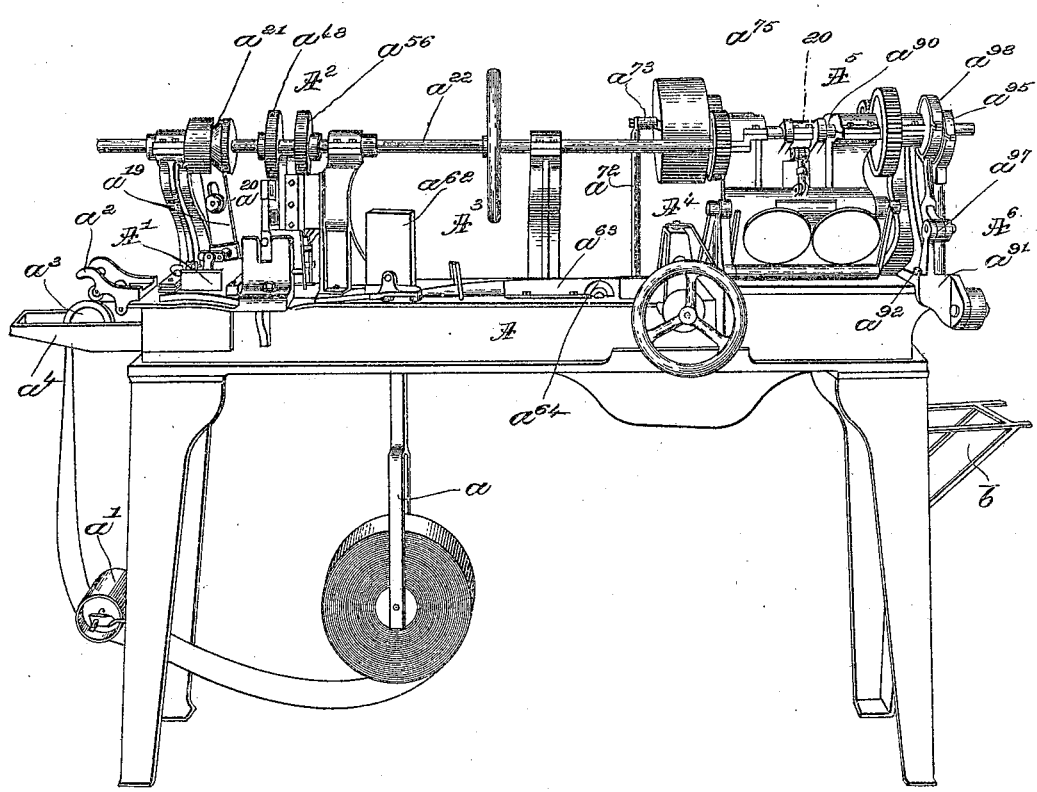
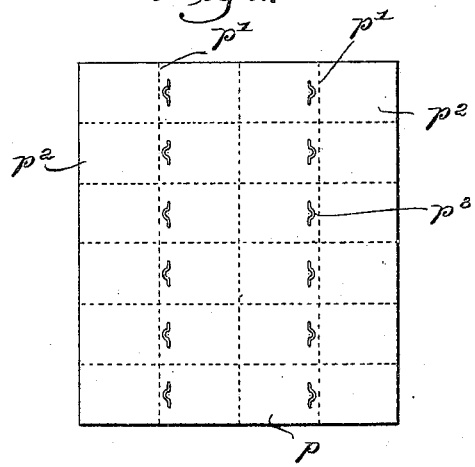
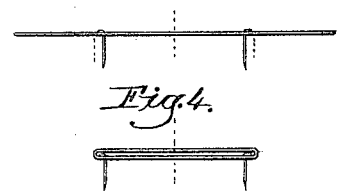
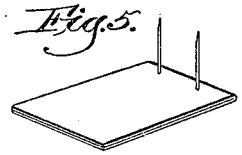
Witnesses:
Thomas J. Drummond
S. Wm Lutton
Inventor.
John P. Kuhns,
By Crosby Gregory,
Attys.

J. P. KUHNS.
PIN TICKET MACHINE.
APPLICATION FILED DEC. 26, 1902.
953,472.
Patented Mar. 29, 1910.
6 SHEETS—SHEET 2.
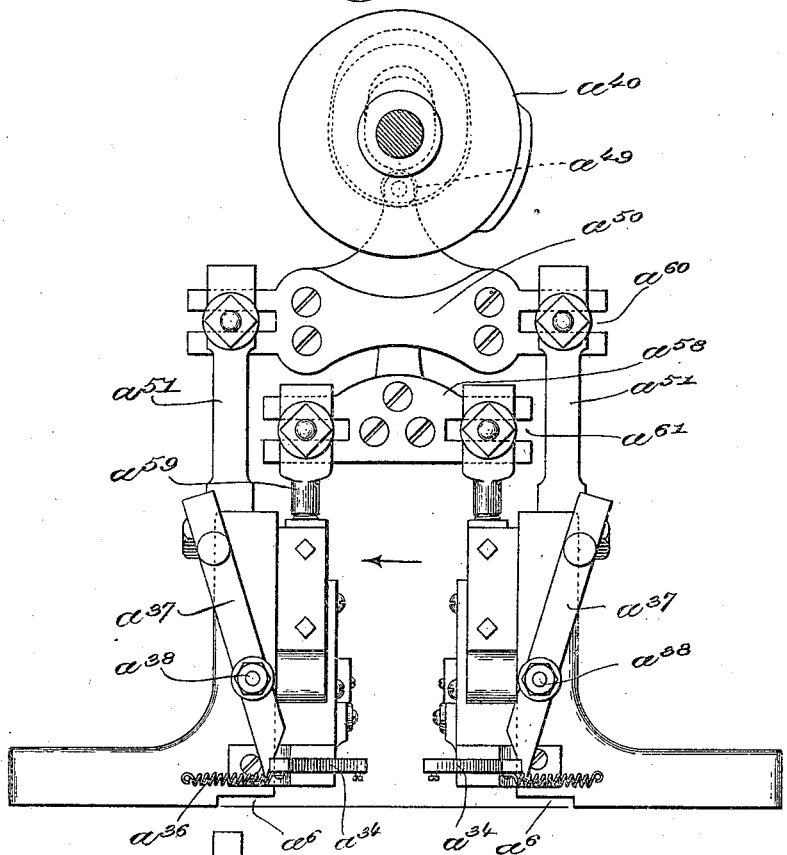
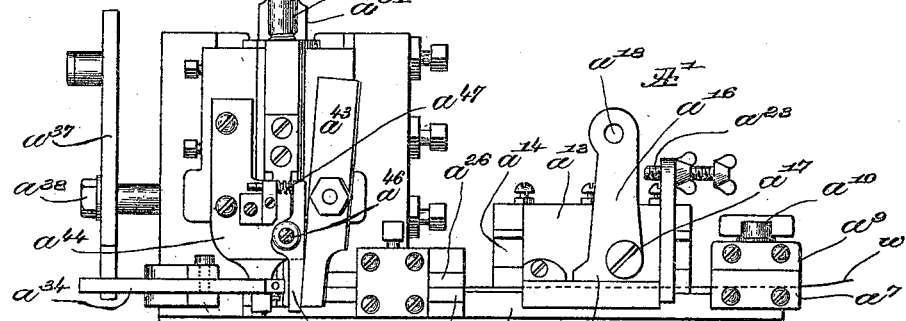

J. P. KUHNS.
PIN TICKET MACHINE.
APPLICATION FILED DEC. 26, 1902.

953,472.

Patented Mar. 29, 1910.
6 SHEETS—SHEET 3.

Witnesses.
Thomas J. Drummond.
S. Wm Lutton.

Inventor.
John P. Kuhns,
by Crosby Gregory
Attys.

ANDREW B. GRAHAM CO., PHOTO-LITHOGRAPHERS, WASHINGTON, D. C.

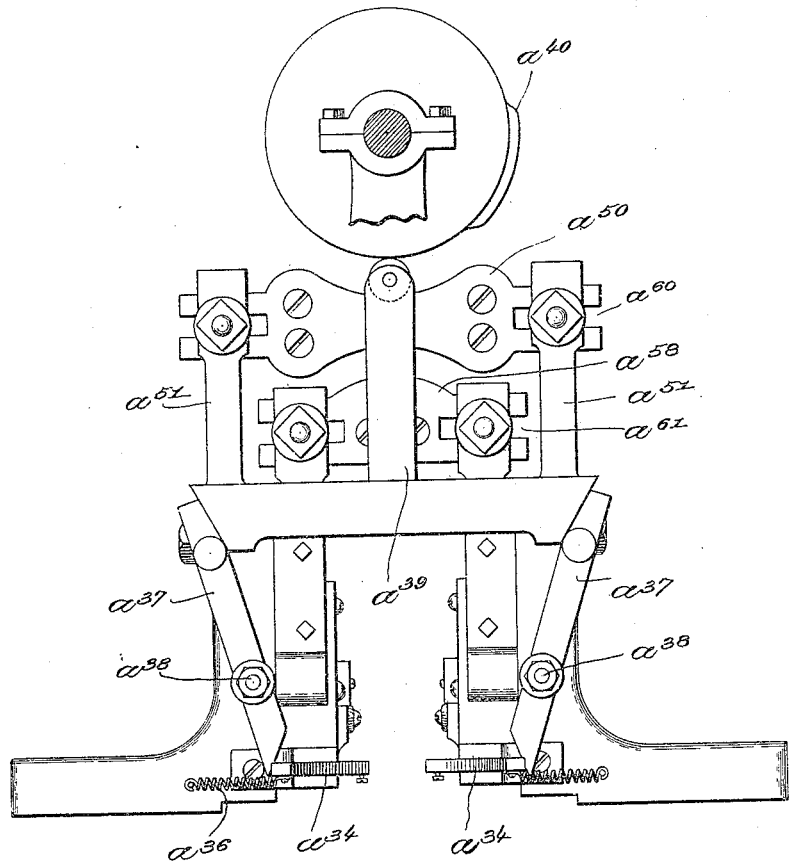
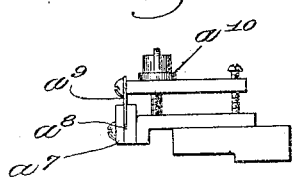

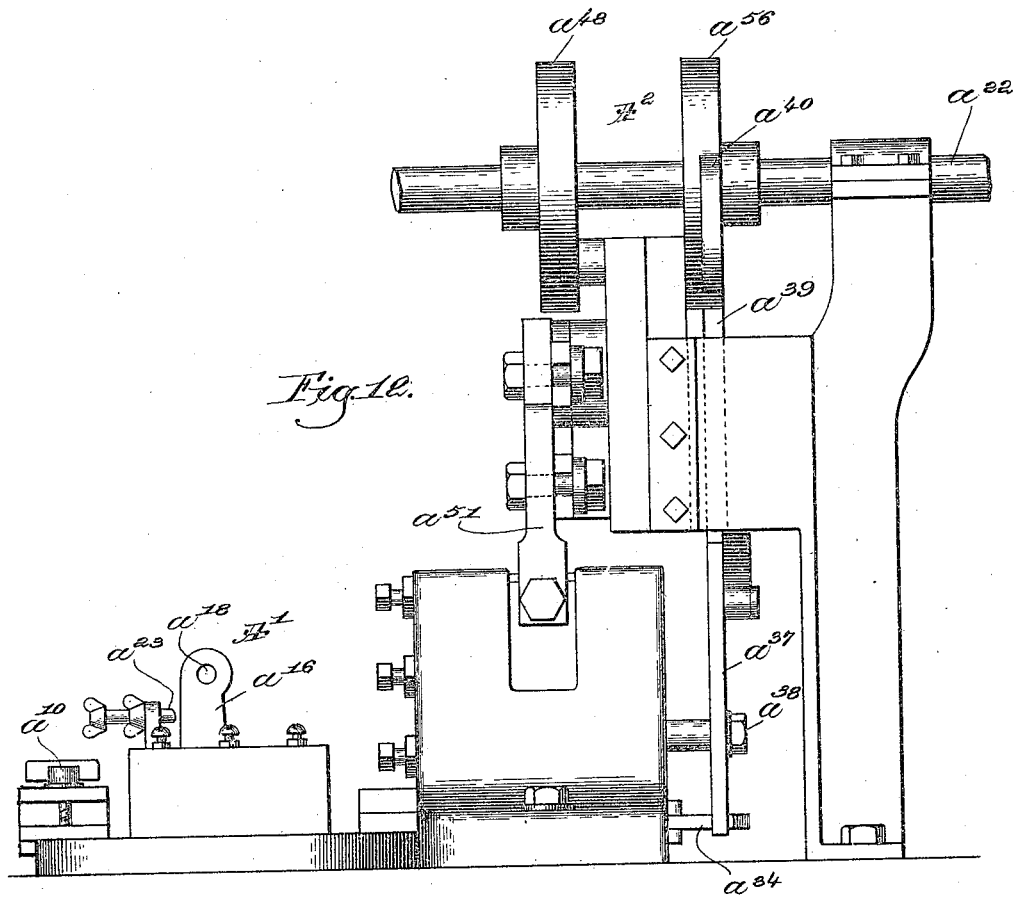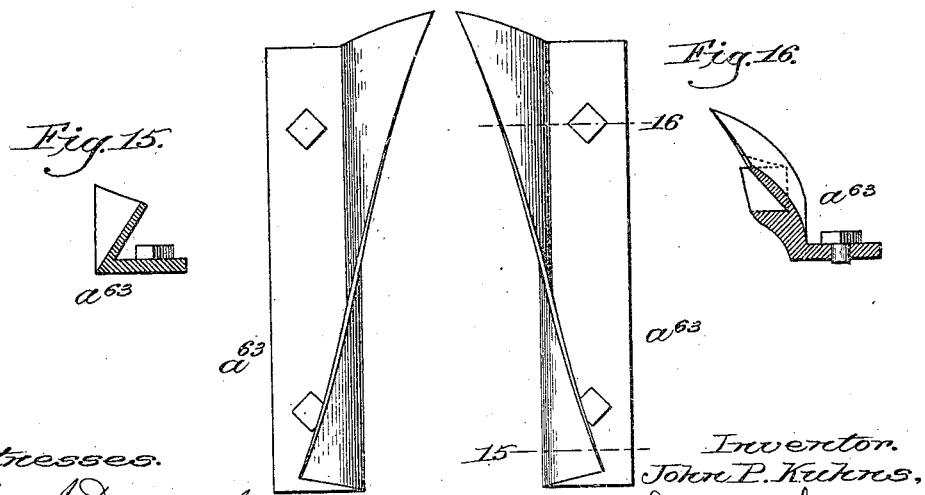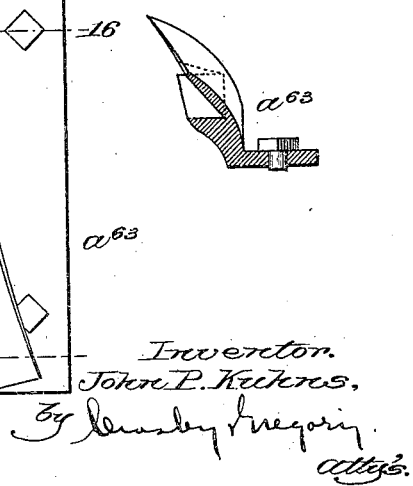

J. P. KUHNS.
PIN TICKET MACHINE.
APPLICATION FILED DEC. 26, 1902.
953,472.
Patented Mar. 29, 1910.
6 SHEETS—SHEET 6.
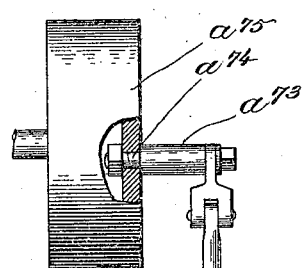

UNITED STATES PATENT OFFICE.

JOHN P. KUHNS, OF DAYTON, OHIO, ASSIGNOR TO NATIONAL TAG COMPANY, OF DAYTON, OHIO, A CORPORATION OF MAINE.

PIN-TICKET MACHINE.

953,472.  Specification of Letters Patent.  Patented Mar. 29, 1910.

Application filed December 26, 1902.  Serial No. 136,533.

*To all whom it may concern:*

Be it known that I, JOHN P. KUHNS, a citizen of the United States, residing at Dayton, county of Montgomery, State of Ohio, have invented an Improvement in Pin-Ticket Machines, of which the following description, in connection with the accompanying drawings, is a specification, like letters on the drawings representing like parts.

My present invention is a machine for making pin-tickets for labeling goods, and resides in providing mechanism which is capable of making and printing the complete ticket with extreme rapidity, accuracy and beauty of finish, said ticket being of the kind in which a staple-like pin is held between two layers of paper glued together thereover, the prongs of the pin projecting through one side of the ticket and the printed matter appearing on the other side thereof. Modern requirements necessitate a great variety of pin-tickets, varying in width, length, weight, style and arrangement of printed matter, etc., and accordingly my present invention provides a machine capable of producing these tickets as required.

In carrying out my invention, I provide a long distance between the staple-driving or fastener-forming mechanism and the printing mechanism for permitting the folding and gluing of the paper stock, and this distance, together with the arrangement of the folding mechanism, enables me to get uniform and accurate folding, and avoids the liability of the paper to become wrinkled or distorted, notwithstanding the rapid movement. Also, I arrange the remaining mechanism of the machine compactly, having the stapling heads face inwardly to permit the staples to be inserted close together and opposite each other, and provide special arrangements adjacent the printing mechanism, said compact arrangement and special location of the parts of the machine being provided so that the printing may be accomplished before the paper becomes dry, as this gives me superior effects, and insures the best results in the general manufacture.

Various other important features of my invention will be pointed out in the course of the following description, such, for example, as the adjustability of the stapling-heads, the mechanism for forming the staples and for driving them, and the means for applying the glue and turning or folding the paper in proper position without danger of separating, and before the glue has set, means for distributing said glue and forcing it into the remotest fold at the edge or folded end of the ticket just prior to the printing thereof and before the severing of the ticket, the latter being accomplished without danger of separating the fold or disturbing the finished ticket.

Figure 9:
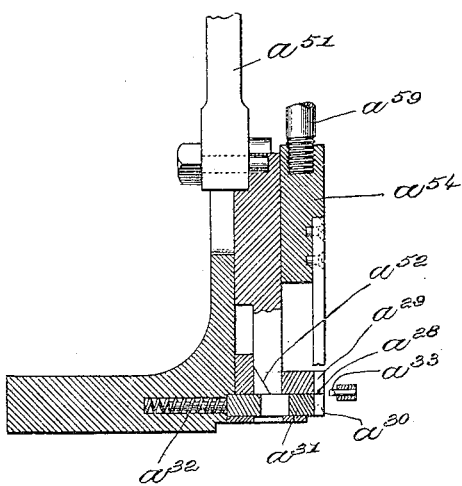
Figure 10:
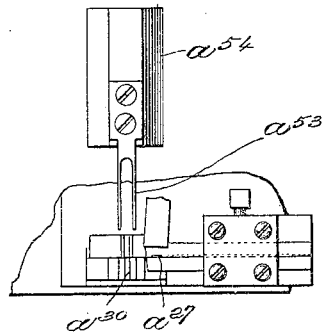

In the accompanying drawings, in which I have shown a preferred embodiment of my invention, Figure 1 is a perspective view of the machine; Figs. 2–5 show the tickets which this form of the machine is constructed to make, Fig. 2 showing the strip of card-board or paper containing the staples, but not yet folded; Fig. 3 is an edge view thereof; Fig. 4 shows the same folded; and Fig. 5 represents in perspective the completed ticket; Fig. 6 is a cross-sectional detail showing in enlarged elevation a portion of the stapling head looking toward the left, Fig. 1, and in the direction of the arrow, Fig. 7; Fig. 7 is a view in side elevation of one half or portion of the head shown in Fig. 6, looking in the direction of the arrow Fig. 6, and the connecting portions being omitted; Fig. 8 is a top plan view of Fig. 6, the same portions being omitted; Fig. 9 is a sectional detail on the dotted line 9—9, Fig. 7; Fig. 10 is a broken detail in front elevation looking at Fig. 9 toward the left; Fig. 11 is a detail of the wire-feeding mechanism in rear elevation; Fig. 12 is a detail in side elevation showing the mechanism for operating the kinker or crimper; Fig. 13 is an end view looking toward the left, Fig. 12; Fig. 14 is a top plan view of the paper-turner or folder; Figs. 15 and 16 are vertical sectional details on the dotted lines 15 and 16, Figs. 14 and 17; Fig. 17 is a view in rear side elevation of the folding, gluing, and creasing mechanism; Fig. 18 is a sectional detail of the latter taken on the line 18—18, Fig. 17; Fig. 19 is a vertical cross-sectional detail on the line 19—19, Fig. 17; Fig. 20 is a cross-sectional detail on the line 20, Fig. 1; Fig. 21 is a fragmentary end elevation looking at the machine toward the left, Fig. 1; Fig. 22 is a sectional detail on the dotted line 22, Fig. 21.

The paper or cardboard to be formed into pin-tickets is carried in any suitable manner, being herein shown as suspended in a roll from a hanger $a$ depending from a frame A of the machine and passing upwardly over a roller $a'$ at the rear end of the machine to scoring mechanism $a^2$ above a roll $a^3$ mounted in a guideway $a^4$, and thence beneath the wire-feeding mechanism A' and the staple-forming and driving mechanism A², whence it passes to the folding mechanism A³, which folds the edges of the paper down over the driven staples, where it is glued in place and pressed by the creasing and paper-feeding mechanism A⁴ just as it is about to pass beneath the printing mechanism A⁵, and thence to the severing mechanism A⁶, from which the individual pin-tickets drop into a receptacle placed on a supporting bracket $b$.

While my invention is capable of making different forms of tickets, for clearness of illustration I have shown in Figs. 2–5 details of the preferred kind of ticket to be made thereby. The strip of paper $p$ fed into the machine has a width four times the length of the finished ticket, as indicated in Fig. 2, and is scored along the lines $p'$. The fasteners are then inserted in opposite pairs, so that there will ultimately be one fastener for each pin-ticket, the individual pin-tickets being indicated by dotted lines in Fig. 2. The sides or flaps $p^2$ outside of said score lines are then folded over from the position shown in Fig. 3 to the position shown in Fig. 4, thereby inclosing the pins or staples at the fold in the creased end of the ticket, and when the two layers of paper are glued and pressed together the finished ticket has the appearance shown in Fig. 5, being printed on the reverse side from that shown in Fig. 5.

Referring now more particularly to Figs. 6–11, in connection with Fig. 1, it will be seen that the feeding and stapling, or fastener-forming, mechanisms are supported on a plate or base $a^5$ resting on the bed of the machine and containing a cut-away portion or recess $a^6$ through which the strip of paper is fed by means of paper-feeding mechanism shown in Fig. 12. Above this paper-receiving recess, at the rear end of the machine, is mounted the wire-feeding mechanism, shown best in Figs. 7, 8 and 11, where it will be seen that a block $a^7$ is provided with a groove $a^8$ above which is a clamping plate $a^9$, whose pressure may be regulated by the thumb-nut $a^{10}$ for providing the frictional resistance to the wire $w$, whence it passes through a similar groove $a^{12}$ (see Fig. 8) in a slide $a^{13}$ mounted to reciprocate in ways $a^{14}$ provided in the inner face of a block $a^{15}$ clamped to the base $a^5$. This slide $a^{13}$ carries a gripping lever or dog $a^{16}$ pivoted at $a^{17}$ thereto and connected at $a^{18}$ to the lower end of the lever $a^{19}$ mounted intermediately on a fixed pivot $a^{20}$, and engaging at its upper end a path cam $a^{21}$ on the main drive shaft $a^{22}$ of the machine. The extent to which the dog $a^{16}$ can move on its pivot is determined by an adjustable stop $a^{23}$, thereby providing means for accurately regulating the amount of feed of the wire at each reciprocation of the slide $a^{13}$. The lower end $a^{24}$ of the dog $a^{16}$, when the latter is moved forward to the left Fig. 7, bites against the wire in the groove $a^{12}$, gripping the latter firmly, so that further forward movement of the dog $a^{16}$ serves to move the slide $a^{13}$ forward on its ways, thereby feeding the wire the definite distance required, and then the reverse movement of the dog $a^{16}$ first releases the wire and then, when the dog contacts with the stop $a^{23}$, retracts the slide to its original position, ready to reëngage the wire and feed it forward another step, the wire meanwhile being prevented from any backward movement by the clamp $a^9$. The wire having been fed forward as explained, passes along a groove or way provided between two plates $a^{25}$, $a^{26}$, and out at the beveled end thereof as indicated at $a^{27}$, Fig. 10, into grooves $a^{28}$, Figs. 9 and 10, provided in the under edges of a pair of projecting fingers or holders $a^{29}$ in position over a former or anvil $a^{30}$ carried by a block $a^{31}$, but capable of being retracted at proper times out of the path of the staple when formed and ready to be driven. When the wire has been properly fed to position as explained, the slight crimp $p^3$, see Fig. 2, therein is formed by the inward movement of a crimper $a^{33}$ carried at the inner end of an arm $a^{34}$ pivoted at $a^{35}$ and actuated against a spring $a^{36}$ by a lever $a^{37}$ pivoted at $a^{38}$, said lever being operated by a reciprocating rod $a^{39}$ actuated by a cam surface $a^{40}$.

As herein shown the staple former and cutter are operated simultaneously by the same carrier, said carrier being indicated at $a^{41}$, Fig. 8, sliding in ways $a^{42}$ and provided at its front side with a knife or cutter $a^{43}$ set at a proper bevel or angle to correspond with the bevel surface at the opening $a^{27}$ where the wire emerges from its guideways, so that the wire is thereby cut obliquely to its length, so as to provide sharp points for subsequently entering the paper. At its other side the carrier $a^{41}$ is provided with one portion $a^{44}$ of the former, the part $a^{44}$ being rigidly secured to said carrier and herein shown as provided at its right-hand side, Fig. 7, with a yielding member $a^{45}$ pivoted thereto at $a^{46}$ and held by a spring $a^{47}$ in position normally moving at its lower end toward the fixed member $a^{44}$. These parts are operated by a cam $a^{48}$ receiving a roll $a^{49}$ from a bar or link $a^{50}$ connected at its ends to rods $a^{51}$ secured, respectively, to the opposite pairs of staple-forming and cutting mechanisms. As the carrier comes down, the knife cuts the wire, and the two members $a^{44}$, $a^{45}$ engage the wire at opposite sides of the anvil $a^{30}$, over which they bend it sharply to form a staple, and as soon as a staple is formed the anvil is withdrawn by a cam $a^{52}$ on the lower end of the carrier $a^{41}$, Fig. 9, which retracts the anvil block $a^{31}$ against the spring $a^{32}$, leaving the staple held by the fixed and yielding formers $a^{44}$, $a^{45}$, in position for driving by the staple-driver. The latter is herein shown as comprising a member $a^{53}$ cut away, as clearly shown in Fig. 10, for the purpose of straddling the holders $a^{29}$ in its necessary reciprocations. This driver or hammer-like member $a^{53}$ is secured to a carrier $a^{54}$ moving in ways $a^{55}$ provided in the front of the carrier $a^{41}$, see Fig. 8, and is operated by a cam $a^{56}$ receiving a roll $a^{57}$ of a bar or link $a^{58}$ connected at its ends to rods $a^{59}$ secured, respectively, to the opposite pairs of staple-driver carriers $a^{54}$, as shown in Fig. 6.

Viewing Fig. 6 it will be observed that the two bars or links $a^{50}$, $a^{58}$ are connected to their respective mechanisms by what I term an open slot connection, the ends of the rods $a^{51}$, $a^{59}$ being clamped in adjustment along the open slots $a^{60}$, $a^{61}$, respectively, thereby permitting quick adjustment for different lengths of tickets simply by the moving in or out of the rod connections along these open slots, and also permitting the quick removal of either of the staple-forming and driving heads without disturbing the other.

The staple having been formed and the anvil retracted as already explained, the staple-driver descends and instantly drives the legs of the staple through the paper into the position shown in Fig. 3, the staple-former member $a^{45}$ yielding to permit the driver to move down freely while yet holding the staple delicately and firmly, so that it cannot get out of position during the driving. As the staple-containing strip of paper emerges, it passes beneath a glue-pot or can $a^{62}$, and thence to the folding mechanism. This folding mechanism occupies a considerable length of space, and I regard this as one of the important features thereof, as will presently be explained.

Opposite shields or plates $a^{63}$ adjacent a roller $a^{64}$ are mounted on the bed of the machine as shown plainly in Figs. 1 and 15, these plates or blades $a^{63}$ being so shaped that they serve to gradually turn up and bend over the edges of the paper until it reaches the roll $a^{64}$, when it is sharply creased by passing thereover, and thence continues on a higher level than its previous passage in the machine, said level corresponding to the top of the roll $a^{64}$. This latter feature also is an important advantage, as it prevents any possibility of the paper buckling or becoming separated; this prevention being due to the fact that the glued surfaces of the paper which have been brought together by their passage through the blades $a^{63}$ and over the roll $a^{64}$ are kept in the same truly horizontal plane, without any possible deflection or disturbance, and therefore without tendency to open, as would be the case if deflected from said true horizontal plane. And the bending of the folded paper when it emerges from the inclined plane occupied in passing through the blades $a^{63}$ to the horizontal plane at the roll, serves to bring the contacting surfaces forcibly together, and serves to crease their edges to some extent, inasmuch as the relatively narrow edges or folds of paper $p^2$ occupy the upper or longer circumference, while the body of the strip occupies the shorter or under surface of the bent portion of the strip in passing this point. The result of this construction is that the paper has sufficient length to fold gradually and neatly, and is brought into the horizontal plane definitely, so that the folding of the paper and distribution of the glue, and proper manipulation of the entire strip, are accomplished with accuracy and rapidity, whereas if a short space were provided, additional rollers and other mechanism would be required, and if the strip were not passed from the lower plane to the higher plane, not only would additional mechanism be necessary, but there would be a liability of the paper opening.

The glue is distributed from the glue-pot by a roll $a^{65}$ contained therein, operated by a ratchet $a^{66}$ and pawl $a^{67}$ from a lever $a^{68}$ connected thereto by a link $a^{69}$ and operated by a rod $a^{70}$ and bell-crank lever $a^{71}$ connected by a link $a^{72}$ to a stud $a^{73}$ radially adjustable at $a^{74}$ in a drum or pulley $a^{75}$ at the forward end of the machine.

The folding mechanism which I have described is specially adapted to give opportunity for the glue to spread and distribute itself properly, but I have found it advantageous to employ spreaders $a^{76}$, shown in Fig. 17 as adjustably mounted on a cross-bar $a^{77}$, supported by posts $a^{78}$ on the bed of the machine, between which the paper passes. These spreaders scrape over the paper and spread the glue evenly, so that when the upper flaps $p^2$ come down on the intermediate part of the strip of paper they find glue at all points thereof. The strip having been folded, passes immediately between the feed rolls and creasing mechanism, said feed rolls being shown in Fig. 18 as a lower feed roll $a^{76}$ and an upper feed roll $a^{77}$, the latter being held down under yielding pressure by a spring $a^{78}$, Fig. 17, and both feed rolls operated by a pawl and ratchet $a^{79}$.

In making pin-tickets of the kind under consideration, in which the pin-heads or staple-heads come close into the fold or crease, there is great tendency for the paper to separate, or rather, not to be tightly folded and cemented at this point, and accordingly I have devised a special creaser for overcoming this difficulty and creasing definitely and neatly the extreme edge or corner of the fold while yielding to permit the passage of each crimp or kink of the staples, this mechanism being shown in Fig. 18, where it will be seen that the upper feed roll $a^{77}$ projects over beyond the lower one sufficiently to afford a space for the passage of the staples, and also to receive a small creasing wheel $a^{80}$ carried at the free end $a^{81}$ of a bell crank lever $a^{82}$ pivoted at $a^{83}$ to the frame of the machine, and having its lower end pressed firmly forward by a spring $a^{84}$, see Fig. 17, so that although the wheel $a^{80}$ can yield when a staple crimp passes over it, yet it will firmly and tightly press against the paper all the time with a proper creasing pressure. The folded paper thus formed, creased, and cemented, is maintained more or less damp by reason of the wet glue which as yet has not had time to set, and this dampness enables me to get a clearer impression in the printing than is otherwise possible.

The ordinary way of making pin-tickets is to print the paper first, before the ticket is formed; but by having the printing mechanism follow immediately after the ticket has been folded, and while it is still damp, the impression is clear and precise and uniform on all the tickets.

The printing mechanism in general may be of any kind desired, and accordingly I have omitted the details thereof, inasmuch as my invention does not reside therein, but rather in having the printing accomplished at the end of the folding operation as explained, and by having the impression made by a straight up-and-down or vertical movement, instead of by a rotary or oscillating movement. The mechanism for this purpose is shown in Figs. 1 and 20, where it will be seen that the platen $a^{85}$ is carried directly over the bed and is moved up and down vertically by a link $a^{86}$ pivoted to the printing frame at $a^{87}$, and operated by a crank $a^{89}$ formed in a shaft $a^{90}$.

Having been printed, the strip passes forward to the cutters, which are mounted on a casting $a^{91}$ adjustable longitudinally of the bed of the machine by a bolt $a^{92}$ and consisting of a transverse knife carrier $a^{93}$ pivoted at $a^{94}$ and operated by an eccentric $a^{95}$ and a longitudinal knife $a^{96}$ operated from a pivot $a^{97}$ by an eccentric $a^{98}$, said two eccentrics being on the shaft $a^{99}$ which carries the belt pulley $a^{75}$ already alluded to. As the paper is yet damp, and the glue still tacky and liable to permit the folds to separate if pulled slightly, it will not do to have the knife simply pass across the paper and back again, because of the liability to separate the folds, and accordingly I provide an overhanging edge $a^{100}$, see Fig. 22, beneath which the folded paper passes, and at the back of the blade I provide a follower or holder $a^{101}$ which is permitted to yield slightly by a spring $a^{102}$ at the back of the cutter blade $a^{103}$, so that as the eccentric $a^{95}$ moves the knife-carrier upwardly, the follower $a^{101}$ precedes the knife and engages the folded paper, holding the same firmly while being cut, and retaining its grasp thereon until after the knife has been lowered out of engagement with the paper (as is evident viewing Figs. 21, 22), thus insuring that the glued paper of the completed ticket will not be disturbed. The holder $a^{101}$ acts as a yielding clamp to permit a clean cut and prevent the knife from dragging the ticket open by its backward movement.

In the course of the foregoing description, I have briefly explained the operation of the machine, which may be summarized as follows. The paper and wire are fed simultaneously into the machine, the paper being first scored, and then passing beneath the staple-forming and inserting mechanism, where it halts to receive the staple which has first been severed from the wire fed into the machine, and has then been kinked or crimped, shaped, and finally driven by the mechanisms $A'$, $A^2$. With the staples in place, the strip of paper passes beneath the glue-pot, and the glue is distributed thereon as the paper begins to fold, being finally bent into precisely the shape desired, and creased by the folders, and creasing devices at $A^3$, $A^4$, when it is printed while still damp by the vertically moving printing mechanism, and is finally severed into the completed tickets, two at a time.

Without undertaking to explain the various embodiments of my invention contemplated as within the scope of the claims, it is enough to point out that various modifications in form, arrangement, and combination of parts may be resorted to without departing from the spirit and scope of said claims.

Having described my invention, what I claim as new and desire to secure by Letters Patent, is:—

1. In a machine of the kind described, paper-strip feeding mechanism, pin-driving mechanism, glue-applying mechanism, folding mechanism, and printing mechanism, said glue-applying mechanism and folding mechanism coöperating to moisten with the glue the area of the paper which is to be printed by said printing mechanism, all arranged for operating on the same paper-strip as it is fed through the machine, said printing mechanism being located to print on the moistened fold while still moist after the gluing and folding operations on the paper-strip.

2. In a machine of the kind described, fastener-forming mechanism, driving mechanism, glue-applying mechanism for applying glue all over one side of a paper-strip, folding mechanism, printing mechanism, and ticket-severing mechanism, arranged to operate on the paper-strip in the order mentioned, and means for feeding said paper-strip to said successive series of mechanisms in the order mentioned.

3. In a machine of the kind described, fastener-applying mechanism, glue-applying mechanism, folding mechanism, and printing mechanism, said folding mechanism including means operating over a considerable length of space for gradually bending or folding over the edge of the paper and passing the same up an incline, and means for delivering the folded strip on a level from the top of said incline to said printing mechanism.

4. In a machine of the kind described, fastener-forming mechanism, glue-applying mechanism, paper-folding mechanism, ticket-severing mechanism, and means for feeding a paper-strip through said machine, said folding mechanism occupying an intermediate portion of the machine between the fastener-forming mechanism and the ticket-severing mechanism, and including means operating over a considerable length of space for gradually bending or folding over the edge of the paper and passing the same up an incline, and means for delivering the folded strip on a level from the top of said incline to be severed.

5. In a machine of the kind described, fastener-applying mechanism, severing mechanism, and folding mechanism located between the same, said folding mechanism including means for bending or folding the edge of the paper over upon the body thereof, and means for bending the paper thus folded in the direction away from said folded-over edge.

6. In a machine of the kind described, fastener-applying mechanism, severing mechanism, and folding mechanism located between the same, said folding mechanism including means for bending or folding the edge of the paper over upon the body thereof, means for bending the paper thus folded in the direction away from said folded-over edge, and means for delivering said paper on a level to said severing mechanism from said bending means.

7. In a machine of the kind described, fastener-applying mechanism, folding mechanism, severing mechanism, and glue-applying mechanism located between said folding mechanism and fastener-applying mechanism, said folding mechanism including means for folding over an edge of the paper upon itself, and said glue-applying mechanism including means for spreading or scraping said glue into the corner or fold of the paper and over the fasteners therein.

8. In a machine of the kind described, fastener-applying mechanism for applying a series of fasteners at regularly spaced intervals, with the fasteners projecting outwardly from the plane of the paper, folding mechanism for folding the paper over upon itself in a plane at right angles to the projecting fasteners, glue-applying mechanism for gluing the paper to itself, folding mechanism, and creasing mechanism for moving the opposite portions of the folded paper forcibly together at the folded edge thereof without interfering with the series of fasteners which are projecting from the paper perpendicular to said opposite portions.

9. In a machine of the kind described, fastener-applying mechanism for applying fasteners with their ends projecting laterally from the plane of the paper-strip, folding mechanism for folding the paper over upon itself in a plane at right angles to the projecting fasteners, glue-applying mechanism for gluing the paper to itself, and creasing mechanism for creasing said glued paper at the folded edge thereof, including means for engaging the extreme edge of the paper beyond the laterally projecting fasteners which then occupy a position on one side of the folded strip between said folded edge and the opposite edge of the strip.

10. In a machine of the kind described, fastener-applying mechanism, folding mechanism for folding the paper over upon itself along the line of said fasteners, glue-applying mechanism for gluing the paper to itself, and yielding creasing mechanism for creasing said glued paper at the folded edge thereof, and yielding to permit the passage of the fasteners.

11. In a machine of the kind described, fastener-applying mechanism, glue-applying mechanism, folding mechanism, and pressing and creasing mechanism comprising an upper and lower pressing roll between which the folded paper passes, one of said rolls extending beyond the other, and a creaser yieldingly supported to press along the edge of the fold against said projecting end of the roll.

12. In a machine of the kind described, means for feeding a wide paper-strip through the machine, folding mechanism for inturning flat upon the intermediate body of the paper-strip the opposite longitudinal edges of said paper, glue-applying mechanism for applying glue to said paper before folding, means for spreading said glue over one side of the entire strip, and fastener-applying mechanism for applying two rows of fasteners opposite each other in said paper to be covered by said folded-over edges, said fastener-applying mechanism comprising a separate head or applying means for each set of fasteners, said heads being adjustable toward and from each other for changing the distance apart of the rows of fasteners.

13. In a machine of the kind described, paper-strip feeding mechanism, feeding mechanism for feeding two wires over said strip, and vertically standing fastener-forming and fastener-driving approximately parallel mechanisms, one for each of said wires, said vertically-standing mechanisms facing each other, and the fastener-driving mechanism extending vertically on the innermost faces thereof for delivering the two sets of fasteners in vertical position close to each other if desired for enabling the machine to make simultaneously two rows of small pin-tickets, and means for adjusting said vertically standing mechanisms toward and from each other for different lengths of pin-tickets.

14. In a machine of the kind described, means for feeding through the machine a paper-strip having a width for forming two rows of pin tickets, glue-applying mechanism, folding mechanism for infolding the opposite edges thereof over toward each other on the body of the strip, means for applying to said paper-strip two rows of fasteners in pairs opposite to each other, and means for severing said strip into pin tickets containing one fastener each.

15. In a machine of the kind described, means for feeding a wide paper-strip through the machine, glue applying mechanism, folding mechanism for infolding the opposite edges thereof over on the body of the strip, means for applying to said paper-strip two rows of fasteners in pairs opposite to each other, means for transversely severing said strip into pin-tickets, and means for varying the distance apart of said rows of fasteners.

16. In a machine of the kind described, means for feeding a wide paper-strip through the machine, folding mechanism for infolding the opposite edges thereof over on the body of the strip, glue-applying mechanism, and means for applying pairs of fasteners opposite to each other close to the folds where the strip is subsequently inturned.

17. In a machine of the kind described, means for feeding a wide paper-strip through the machine, a pair of heads beneath which said strip is fed, means for adjusting said heads close to each other, glue-applying mechanism, and folding mechanism, each of said heads containing means for forming a staple, means for crimping the head thereof, and a staple-driver for driving said staple when thus formed into said paper-strip.

18. In a machine of the kind described, means for feeding a wide paper strip through the machine, glue applying mechanism, folding mechanism for folding the glued paper over upon itself, and a pair of staple-forming and staple-applying mechanisms for applying two rows of staples to said paper in pairs opposite to each other, said forming means including yielding directing members for clamping the formed staples between them and longitudinally holding the same as the staples are being driven.

19. In a machine of the kind described, means for feeding a wide paper-strip through the machine, a pair of heads beneath which said strip is fed for applying staples to said paper in pairs opposite to each other, glue-applying mechanism, and folding mechanism for folding the glued paper over said pairs of staples, each of said heads containing means for forming a staple, means for crimping the head thereof, and a staple driver, said forming means including yielding directing members for clamping the formed staple between them and yielding as the driver passes down between them.

20. In a machine of the kind described, paper feeding mechanism, wire feeding mechanism, staple-forming and driving mechanism, and a crimper for crimping the middle portion of the head of the staple in a direction transverse to the direction of the remainder of the ends of the staple-head at the opposite sides of the crimp.

21. In a machine of the kind described, mechanism for making a pin-ticket, including means for feeding through the machine a paper-strip to form the tickets, wire feeding mechanism, staple forming and driving mechanism, and a crimper for crimping the middle portion of the head of the staple in a direction transverse to the plane of the staple in said paper, said staple forming and driving mechanism coöperating to form and locate in said paper-strip a series of staples at regularly spaced intervals having all of their parts, excepting said middle-crimped portion, in one and the same plane perpendicular to said paper.

22. In a machine of the kind described, means for feeding through the machine a paper-strip to form the tickets, wire feeding mechanism, staple forming and driving mechanism, including means for driving through the paper-strip a series of staples at regularly spaced intervals in a direction at right angles to the plane of the paper-strip, and means for transversely crimping the heads of the staples at their middle portions, leaving all those parts of the staple head which engage the paper in alinement with each other from said crimped portion to the place where the legs project from the paper.

23. In a machine of the kind described, paper-feeding mechanism, wire-feeding mechanism, staple-forming and driving mechanism, glue-applying mechanism, and folding mechanism, said staple-forming mechanism comprising two separated fingers for holding the wire, and means for crimping the head of the staple transversely of said separated fingers, thereby forming the crimp in the head of the wire in a direction transverse to that in which the legs of the staple project from the ends of the straight-portion crimp.

24. In a machine of the kind described, paper-feeding mechanism, wire-feeding mechanism, staple-forming and driving mechanism, glue-applying mechanism, and folding mechanism, said staple-forming mechanism comprising two separated fingers for holding the wire, a crimper movable between said fingers for crimping the wire, an anvil beneath said fingers, opposite members for bending the wire over said anvil, and a severing device for cutting the wire.

25. In a machine of the kind described, paper-feeding mechanism, wire-feeding mechanism, staple-forming and driving mechanism, glue-applying mechanism, and folding mechanism, said staple-forming mechanism comprising two separated fingers for holding the wire, a crimper movable between said fingers for crimping the wire, an anvil beneath said fingers, opposite members for bending the wire over said anvil, and a severing device for cutting the wire, and said driving mechanism comprising means for retracting said anvil, and a driver for simultaneously descending on the staple and forcing the same through the paper.

26. In a machine of the kind described, paper-feeding mechanism, wire-feeding mechanism, staple-forming and driving mechanism, glue-applying mechanism, and folding mechanism, said staple-forming mechanism including yielding members for bending the wire into a staple and retaining the same between them when bent, and said driving mechanism including a driver movable down between said yielding members for engaging and driving the staple held by the latter.

27. In a machine of the kind described, means for feeding a wide paper-strip through the machine, a pair of heads beneath which said strip is fed, glue-applying mechanism, and folding mechanism, each of said heads carrying mechanism for forming and driving a staple or fastener, means for operating said two heads simultaneously, said means including plates or links spanning across the machine and connected at their ends to the operating mechanism of said respective heads, the connection thereat consisting of open-ended slots permitting the heads to be independently slid out from said slots for adjustment or repairs.

28. In a machine of the kind described, fastener-applying mechanism, glue-applying mechanism, folding mechanism, severing mechanism, and feeding mechanism for feeding paper through the machine, said paper passing beneath the glue-applying mechanism, and the latter being provided at its bottom with a glue discharge opening and with mechanism for discharging thereat fresh glue directly on the paper, and a glue spreader operating on the paper to spread said glue thus discharged.

29. In a machine of the kind described, fastener-applying mechanism, glue-applying mechanism, folding mechanism including means to smear the glue all over one side of the paper, printing mechanism, and paper-strip feeding mechanism, said printing mechanism acting on the paper while the latter is still moist with the glue into which it has been compressed, and including a platen, and means for moving said platen straight up and down above said damp paper for giving a direct, square impression on the paper.

In testimony whereof, I have signed my name to this specification, in the presence of two subscribing witnesses.

JOHN P. KUHNS.

Witnesses:
    HARLOW E. SPRING,
    MARION V. DE GARMO.